(12) United States Patent
Nishio et al.

(10) Patent No.: US 6,986,583 B2
(45) Date of Patent: Jan. 17, 2006

(54) TABLE TYPE DISPLAY DEVICE AND AN ASSEMBLING METHOD THEREOF

(75) Inventors: Tadashi Nishio, Iruma (JP); Ikuharu Sadano, Hachioji (JP); Atsutoshi Yokota, Kamiina-Gun (JP); Takanori Ishizawa, Tachikawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 87 days.

(21) Appl. No.: 10/454,885

(22) Filed: Jun. 4, 2003

(65) Prior Publication Data

US 2004/0109145 A1 Jun. 10, 2004

(30) Foreign Application Priority Data

Jun. 5, 2002 (JP) .................................... 2002-164728

(51) Int. Cl.
*G03B 21/28* (2006.01)

(52) U.S. Cl. ............................................. 353/94; 353/30
(58) Field of Classification Search ................... 353/74, 353/77, 78, 79, 94, 98, 99
See application file for complete search history.

(56) References Cited

U.S. PATENT DOCUMENTS

| | | | | |
|---|---|---|---|---|
| 5,457,508 A | * | 10/1995 | Ichihara et al. ............... 353/10 |
| 5,897,192 A | * | 4/1999 | Seufert ......................... 353/74 |
| 5,902,030 A | * | 5/1999 | Blanchard .................... 353/30 |
| 5,956,000 A | | 9/1999 | Kreitman et al. |
| 6,407,859 B1 | | 6/2002 | Hennen et al. |
| 6,478,432 B1 | * | 11/2002 | Dyner ......................... 359/858 |
| 6,607,275 B1 | * | 8/2003 | Cimini et al. .................. 353/28 |
| 2001/0022651 A1 | | 9/2001 | Kubota et al. |
| 2004/0057024 A1 | | 3/2004 | Nishio et al. |
| 2004/0068736 A1 | | 4/2004 | Lafon et al. |
| 2004/0080720 A1 | * | 4/2004 | Saito ............................ 353/79 |

FOREIGN PATENT DOCUMENTS

| | | |
|---|---|---|
| JP | 09-326981 A | 12/1997 |
| JP | 2000-305079 A | 11/2000 |
| JP | 2002006394 A | 1/2002 |

* cited by examiner

*Primary Examiner*—William C. Dowling
(74) *Attorney, Agent, or Firm*—Frishauf, Holtz, Goodman & Chick, P.C.

(57) ABSTRACT

A table type display device capable of selecting the best projector according to user's budget and mode is provided for with easy exchange of the projector.

The table type display device comprises four projectors 1LU, 1LL, 1RU, and 1RL for projecting luminous flux to form image, reflection mirrors 2U and 2L for bending an optical path of luminance flux projected from each of these projectors, and a screen 3 of horizontal installation type for projecting luminous flux with its optical path being bent by reflection mirrors 2U and 2L, onto predetermined regions respectively.

The screen housing portion 4b of the main body unit 4 accommodates the screen 3, the reflection mirrors 2U and 2L, and the light shading plates 6LU, 6LL, 6RU, and 6RL, and the projector unit housing portion 4a of the main body unit 4 accommodates projectors 1LU, 1LL, 1RU, and 1RL housed by the projector unit 5.

7 Claims, 15 Drawing Sheets

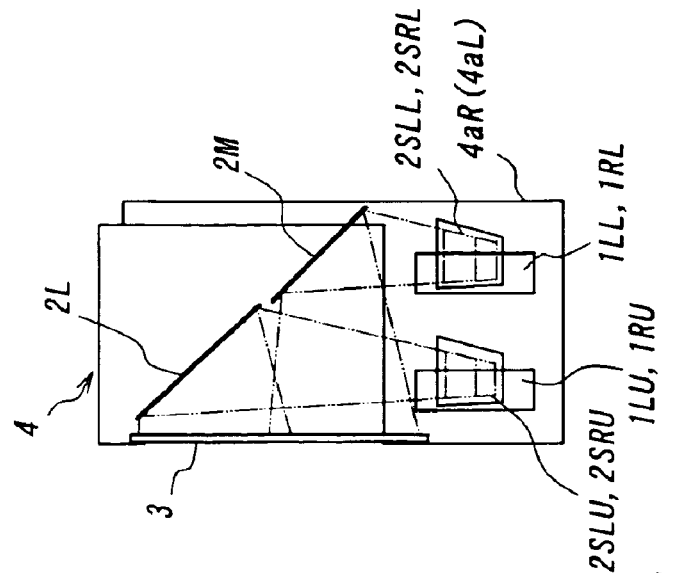
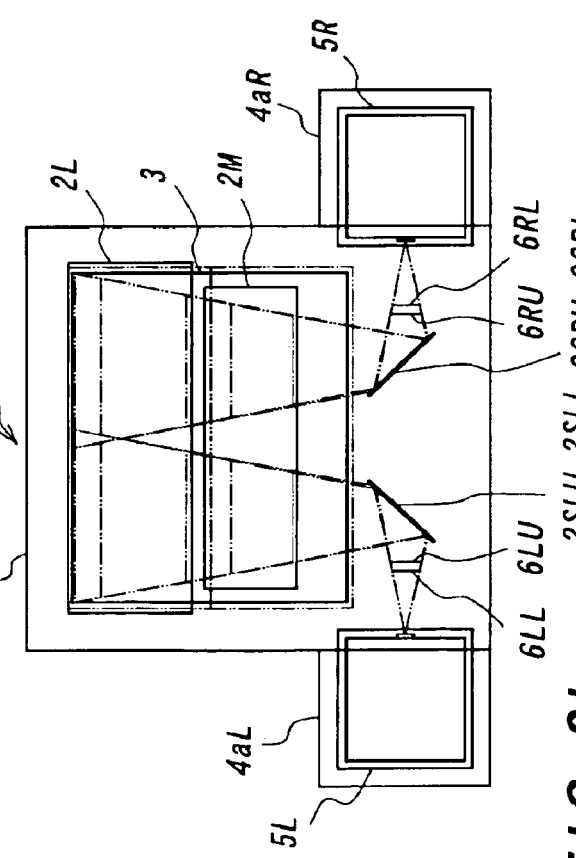
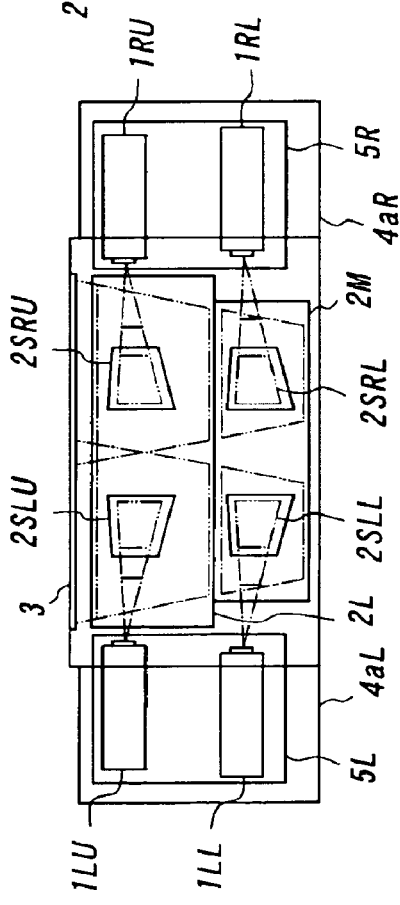
FIG. 9a
FIG. 9b
FIG. 9c

TABLE TYPE DISPLAY DEVICE AND AN ASSEMBLING METHOD THEREOF

BACKGROUND OF INVENTION

1. Technical Field That Invention Belongs

The present invention relates to a table type display device for displaying an image on a screen of a horizontal located type, particularly, a table type display device with easy exchange of projector and easy change of resolution in display according to user's needs, and an assembling method thereof.

2. Related Technology

As a conventional table type display device to display the image on the screen of the horizontal location type, there are a display device of type of displaying images on an LCD panel constituted by for example burying one LCD panel of about 10 inches–14 inches in a horizontal plane of a table type casing, and a display device of the type shown in FIG. 15. The conventional table type display device shown in FIG. 15 corresponds to the device described in FIG. 3 of Japanese Patent Laid-open No. 305,079/2000, and comprises one projector 51 for projecting luminous flux to form an image, two reflection mirrors 52 and 53 for bending an optical path of luminous flux projected from the projector 51 twice, and a transparent screen 54 of the horizontal location type, from which luminous flux bent two times, is projected to an optical path by these reflection mirrors 52 and 53, which are built in a same casing 55, the casing 55 is constituted in the shape of the desk, and the transparent screen 54 constitutes the desk plane (table plane).

A conventional table type display device shown in FIG. 15 adopts a construction in which the luminous flux projected from one projector 51 is projected on a transparent type screen 54 through two the reflection mirrors 52 and 53, so that the resolution of the projector becomes the same as the display resolution on the screen, and thus for example, in the case that a projector with the resolution of XGA (1024×768 pixels) is used, the display resolution on the screen will be fixed to XGA.

For example, in case of using a projector of rear projection system marketed as the above projector, the projector will break in a short term of about one year though it depends on the using frequency of the display device. On the one hand, since the restyling or model change is frequently performed to the projector of a rear projection system on the market, when about one year passes after activation, the projector of a rear projection system on the market becomes manufacturing discontinuance for restyling, therefore, the case that the projector of the same model cannot be obtained, frequently generates.

The conventional table type display device described in FIG. 15 is assumed to be a structure to build the projector 51 being an constructional element, reflection mirrors 52, 53, and the transparent screen 54, etc. into the same casing 55 as one body, so that for example, when the necessity for exchanging the projector by the failure is caused, if the projector of the same model can not be obtained, it is necessary to use a projector of another model to which the specification is similar as much as possible. In that case, for example, even if a projector to which the resolving degree, the projection distance, and the projection angle are common, is used, there are a lot of cases that the size and the shape etc. of the projector before and after the exchange are different, so that it is necessary to recompose the support structure that supports the projector to the casing, and the exchange of the projector is extremely difficult. Moreover, as described above, it is assumed the structure to build the projector 51, reflection mirrors 52 and 53, and the transparent screen 54, etc. into the same casing 55 as one body, so that by using the projector with a different resolution properly, with a casing, a reflection mirror, and a transparent screen etc. of a design commonly, it is not possible to constitute the table type display device according to the display resolution corresponding to user's needs and user's budgets and modes, and thus freedom degree of the system design becomes lower.

SUMMARY OF THE INVENTION

The present invention has for its first object to provide a table type display device with easy exchange of the projector and capable of selecting the best projector according to user's budget and mode.

The present invention has for its second object to provide a downsized table type display device.

The present invention has for its second object to provide a method of assembling the table type display device suiting the first object.

In order to achieve the above first object, a first invention is provided in which a table type display device comprises a plurality of projectors for projecting luminous flux to form an image, a plurality of reflection mirrors for bending optical paths of the luminous flux projected from respective projectors, and a horizontally installed screen onto which the light reflected by the plurality of reflection. The plurality of reflection mirrors is projected. The plurality of reflection mirrors reflect the light onto respective predetermined regions. A main body of the table type display device houses the screen and the plurality of reflection mirrors therein, and the plurality of projectors are accommodated in a casing other than the main body.

It is desirable that the casing besides the main body of the above table type display device is constituted so as to be able to use plural kinds of projectors, of which the projection distance and the projection angle are common together, since the exchange of the projector is facilitated, the best projector is selected according to user's budget and mode, and the model exchange of the projector in case of the maintenance is easily performed.

It is desirable that the luminous flux projected respectively by the plurality of projectors is reflected in the same direction by the reflection mirror, since luminous flux from the respective projectors is projected to the respective predetermined regions of the screen, and a plurality of images of images are arranged and displayed on one screen.

In order to achieve the above second object, a second invention is provided in which a table type display device comprises four projectors, including two upper projectors and two lower projectors, for projecting luminous flux to form an image, four small mirrors for bending optical paths of the luminous flux projected from the respective projectors, a medium mirror arranged at a lower part of the device, for bending the optical paths of the luminous flux from the lower projectors reflected by two of the small mirrors, and a large mirror arranged at an upper part of the device for bending the optical paths of the luminous flux from the upper projectors reflected by two of the small mirrors, and, a horizontally installed screen onto which the luminous flux reflected by the medium mirror and the large mirror is projected. The medium mirror and the large mirror project the luminous flux onto respective predetermined regions.

In order to achieve the above second object, a third invention is provided in which a table type display device comprises four projectors for projecting luminous flux to form an image, four small mirrors for bending optical paths of the luminous flux projected from the respective projectors, at least one common mirror for bending the optical paths of luminous flux reflected by at least two of the four small mirrors, and a horizontally installed screen onto which the luminous flux reflected by the common mirror is projected, such that the common mirror reflects the luminous flux onto a predetermined region of the screen.

It is desirable to set the predetermined region so as to overlap the luminous flux projected from the respective projectors on the screen, in order to perform a processing (calibration processing) for making the seam of the image unremarkable, when luminous flux from respective projectors are projected onto the predetermined region of the screen of the horizontal installation type respectively and the multiple images are arranged and displayed on one screen.

It is preferable that the screen is supported with an outer covering and the outer frame installed outside of the above table type display device, that the respective mirrors are supported with the inner frame installed independently of the outside covering and the outside frame, and that the projector is supported with the support unit positioned to the inner frame, in order to strengthen the strength of the screen for housing the main body of the table type display device of first invention, or in order to make the table type display device of the fourth to sixth inventions compact.

It is preferable for the inner frame to provide an adjuster for adjusting the size in the height direction in order to install the frame parallel substantially to the floor face at the installation thereof.

It is preferable for the outer covering and the outer frame to provide an adjuster for adjusting the size in the height direction in order to install the outer covering and the outer frame parallel substantially to the floor face at the installation thereof.

It is preferable for the inner frame to provide a level for adjusting the horizontal degree in order to make easy a work to install the inner frame parallel substantially to the floor face.

In order to correct the luminance of the overlap region on the screen, it is preferable to provide the light shading plate between respective projectors and the corresponding small mirror, so as to simplify the work for correcting the luminance of the above overlap region.

It is preferable that the light shading plate is provided to the inner frame for supporting the mirror, so as to simplify the work for correcting the luminance of the overlap region.

It is preferable that the light shading plate is provided to the support unit for supporting the projector, so as to simplify the work for correcting the luminance of the overlap region.

In the first invention, after the optical path is bent by the plurality of reflection mirrors, the luminous flux projected from each of the plurality of projectors, is projected to respective predetermined regions of the screen. The main body of the table type display device accommodates the screen and the plurality of reflection mirrors, and the plurality of projectors is accommodated in the casing other than the main body so that the exchange and mounting operations of the projectors can be performed only in the casing other than the main body without influencing on the main body of the table type display device in any way, it is necessary to exchange the projectors due to failure, etc. Therefore, the exchange of the projector is easy, and a table type display device capable of selecting the best projector according to a user's budget and mode, can be provided.

In the second invention, the luminous flux projected from each of the four projectors is projected onto the respective predetermined region of the screen, after the optical path is bent with four small mirrors, and one of the medium mirror arranged in the lower part of the device and the large mirror arranged in the upper part of the device. The one large mirror is arranged to correspond to the luminous flux from the two upper projectors, and the one medium mirror is arranged to correspond to the luminous flux from the two lower projectors so that the height of the device can be reduced. Therefore, it is possible to provide a table type display device which is compact in the direction of height.

In the third invention, the luminous flux projected from each of the four projectors is projected onto the respective predetermined regions of the screen, and the optical path is bent with four small mirrors, and at least one common mirror, so that a table type display device having a simplified constitution with a minimum number of small mirrors for four projectors can be obtained. Therefore, a compact table type display device can be provided.

BRIEF EXPLANATION OF DRAWING

FIGS. 9(a)–(c) are three orthographic views showing a structure of the table type display device of second embodiment according to the present invention.

PREFERRED EMBODIMENT OF INVENTION

Figure 1A:
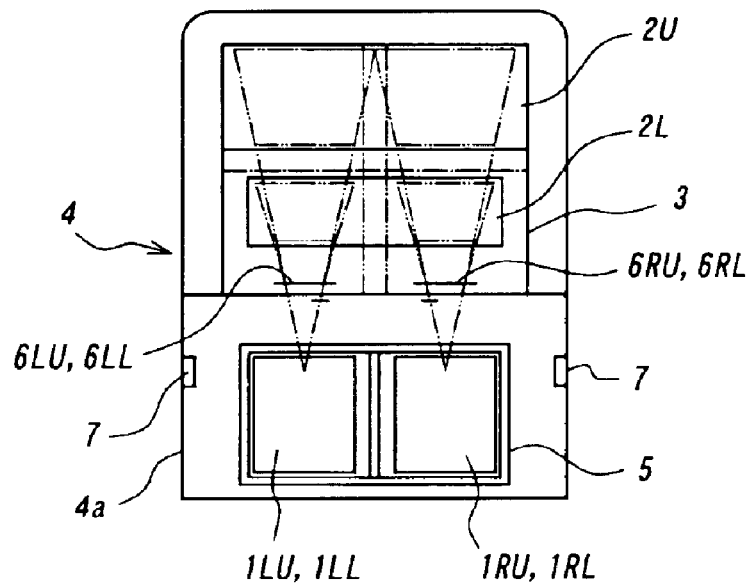
FIGS. 1(a)–(c) are three orthographic views showing a structure of the table type display device of first embodiment according to the present invention.
Figure 1B:
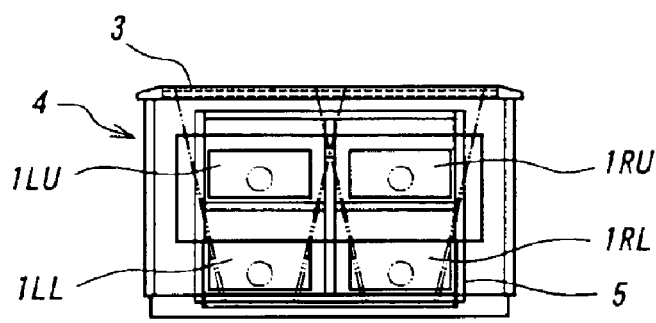
Figure 1C:
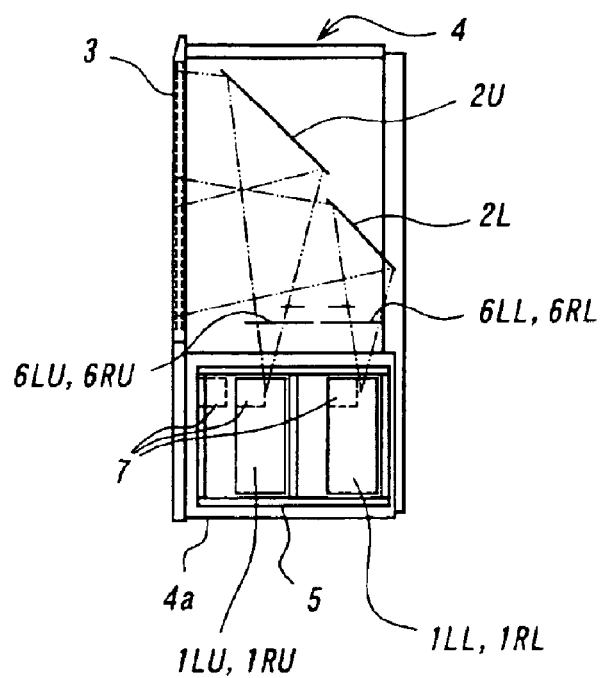

Hereafter, the embodiments of the present invention are explained in detail with reference to the drawing. FIGS. 1(a)–(c) are three orthographic views showing a structure of the table type display device of first embodiment according to the present invention. The table type display device of the present embodiment comprises, as shown in respective figures of FIG. 1, plural M (four in shown embodiment) of projectors 1LU, 1LL, 1RU, and 1RL of rear projection system for projecting luminous flux to form an image plural N of reflection mirrors 2U and 2L (N=2 in shown embodiment) for bending optical paths of luminous flux projected from respective projectors 1LU, 1LL, 1RU, and 1RLa screen 3 of horizontal installation type for projecting luminous flux of which optical path is bent with reflection mirrors 2U and 2L, to predetermined region, respectively a main body unit 4 being main body of table type for storing the screen 3 and the reflection mirrors 2U and 2L, and a projector unit 5 etc. of another casing which is provided besides main body unit 4 and for storing the projectors 1LU, 1LL, 1RU, and 1RL. Moreover, the main body unit 4 has a projector unit housing portion 4a and a screen housing portion 4b, light shading plates 6LU, 6LL, 6RU, and 6RL are provided forward reflection mirrors 2U and 2L for bending the optical path of the luminous flux projected from projectors 1LU, 1LL, 1RU, and 1RL, respectively, in the screen housing portion 4b, and many fans 7 for cooling are provided in the projector unit housing portion 4a of the main body unit 4.

Four projectors 1LU, 1LL, 1RU, and 1RL are, viewing as shown in FIG. 1(b), respectively, arranged at upper right, lower right, upper left and lower left in the projector unit 5, respectively, so that these projectors were named as described above. Moreover, a reflection mirror 2U is a reflection mirror commonly located on the upper part of the unit so as to bend and to lead up the optical path of the luminous flux horizontally projected from upper two projectors 1LU and 1RU 90 degrees, and a reflection mirror 2L is a reflection mirror commonly located on the lower part of the unit so as to bend and to lead up the optical path of the luminous flux horizontally projected from lower two projectors 1LL and 1RL 90 degrees, so that these reflection mirrors were named respectively as described above. In the case of the above arrangement, the luminous flux projected from each of projectors 1LU and 1RU can be reflected to the same direction for the screen 3 with reflection mirror 2U for projecting the said luminous flux, and the luminous flux projected from each of projectors 1LL and 1RL can be reflected to the same direction for the screen 3 with reflection mirror 2L for projecting the said luminous flux. Moreover, in this embodiment, the reduction in the parts count is contemplated by commonly locating one reflection mirror for the right and left two projectors, but one reflection mirror may be located to respective projectors respectively. Moreover, in FIG. 2 described later, the reflection mirror 2U and the reflection mirror 2L are constructed by one common mirror, and one common mirror may be located to four projectors.

The projectors 1LU, 1LL, 1RU, and 1RL are supported horizontally in the projector unit 5, as described later in detail. The projector of the high resolution is used as the projectors 1LU, 1LL, 1RU, and 1RL, and in the present embodiment, a projector having the resolution of SXGA (1280*1024 pixels) is used, but, instead thereof, the projector having the resolution of XGA (1024*768 pixels) may be used. Moreover, the projectors 1LU, 1LL, 1RU, and 1RL are arranged respectively, in such a manner that the luminous flux is projected onto the whole of the four halves surface regions formed by dividing the screen 3 by four in the direction of the front, back, left and right of FIG. 1 (a). Moreover, in this case, the respective projectors and the reflection mirrors are arranged in such a manner that the luminous flux are overlapped and displayed on the adjacent parts of the four halves surface region, but the luminous flux may also be displayed without overlapping. Moreover, in case of displaying luminous flux with overlapped relation, the display resolving degree of screen 3 becomes small more than as many as four projectors (2560*2048 pixels).

As the screen 3, for example, a screen of multiplayer structure formed by stacking a transparent base member for reducing flexure of the screen, an optical sheet having a function that makes luminous flux projected from respective projectors uniform substantially, and a diffusing screen for imaging the image, from the under sequentially, is used.

Figure 2:
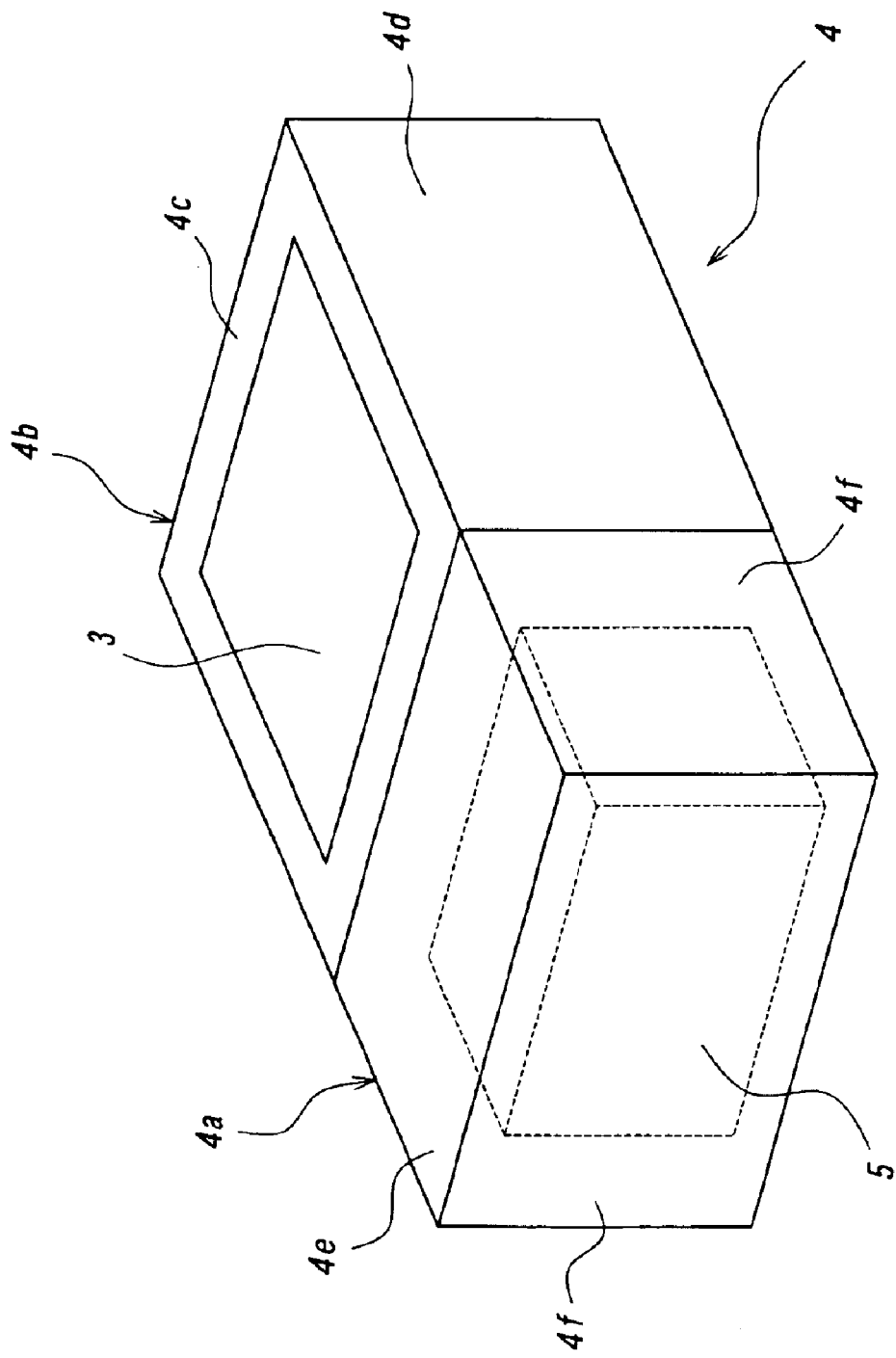
FIG. 2 is a perspective view of the main body unit of the table type display device of the first embodiment according to the present invention.
Figure 3:
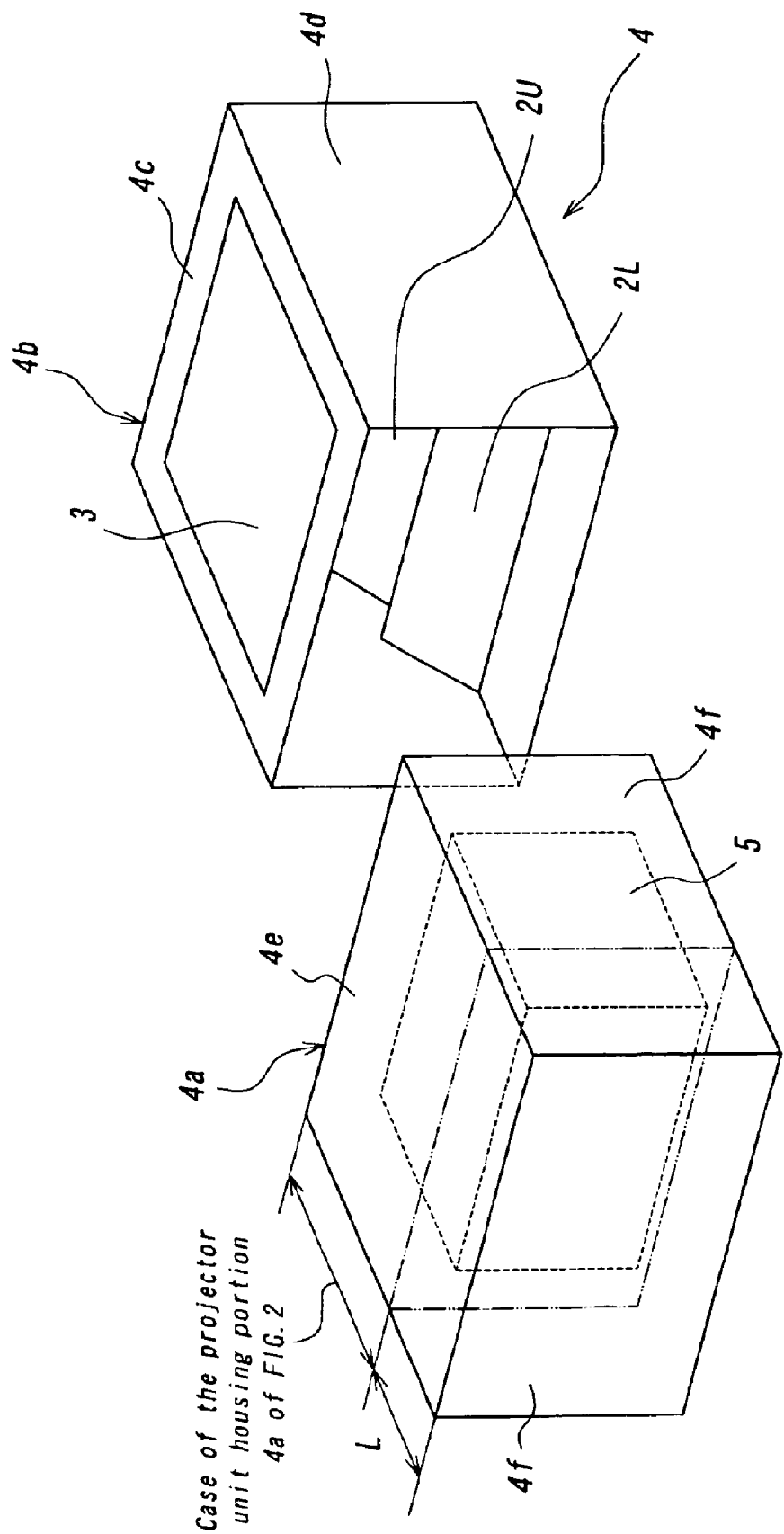
FIG. 3 is an exploded perspective view showing the modified embodiment of the main body unit of the table type display device of the first embodiment according to the present invention.

As the main body unit 4, the main body unit shown in the perspective views of FIG. 2 or the main body unit 4 shown in the exploded perspective view of FIG. 3 is used. The main body unit 4 of FIG. 2 is constituted so as to be able to correspond to the exchange of a comparative small-scale projector, and this does not assume even the exchange of a large-scale projector to need the exchange of projector unit housing portion 4a itself. On the one hand, the main body unit 4 of FIG. 3 is constituted so as to correspond to the exchange of a large-scale projector to need the exchange of the projector unit housing portion 4a itself. Therefore, the main body unit 4 shown in FIGS. 2 and 3 has the common screen housing portion 4b, and the projector unit housing portion 4a of a different construction as shown in the FIGS. 2 and 3.

The screen housing portion 4b provided to the main body unit 4 of FIGS. 2 and 3 commonly comprises an outside frame (not shown) comprising a plurality of frame members combined in three dimensional direction, a top surface covering 4c and a frame side cover 4d which are installed to cover four faces (top surface housing the screen 3 and three side faces except one face of the projector unit housing portion 4a in 4 side faces) at outer side of the outer side frame, and an inner frame installed in the screen housing portion 4b (not show). The inner frame is provided independently of the outer frame, the top surface covering 4c, and the frame side cover 4d, and comprises the mirror base member and a plurality of mirror support members (both are not shown) combined on the mirror base member. The outer frame and the inner frame comprise a positioning mechanism (not shown) in order to arrange them in a position relation. Moreover, the outer frame, the top surface covering 4c, and the frame side cover 4d have adjuster (not shown) for adjusting the height direction size in order to place them parallel substantially for the floor face at the installation, similarly, the inner frame has an adjuster for adjusting the size of height direction so as to make the frame parallel substantially to the floor face at the installation thereof. In addition, the inner frame comprises a level meter (not shown) to adjust the horizontally. Moreover, the table type display device of the present embodiment has a voice output function as described later so that the stereo speaker for the voice regeneration is incorporated or provided externally. Moreover, some of users do not require voice output function, so that in this case, the constitution saving the stereo speaker by deleting the voice output function may be provided.

In the above, the screen 3 is supported by the top surface covering 4c, the side cover 4d, and the outer frame, and The reflection mirrors 2U and 2L and the light shading plates 6LU, 6LL, 6RU, 6RL are supported by the inner frame independently of the outer covering and the outer frame. The strength of the screen 3 can be strengthened by adopting such a support structure, as a result, the viewer can be ridden on the screen and the screen is prevented from being shaken in case of loading a part of the weight of the viewer thereon. Moreover, in this embodiment, the work correcting the luminance of the above overlap region is simplified by providing the light shading plate to the inner frame, but instead thereof, even if the light shading plate is provided to projector unit 5 the work correcting the luminance of the above overlap region can be simplified.

The light shading plates 6LU, 6LL, 6RU and 6RL act to cut luminous flux that there is no necessity in a real image display, in such a manner that when luminous flux from four projectors 1LU, 1LL, 1RU and 1RL are projected to make overlap to the four halves surface regions of the screen 3 as described above, the substantially uniform luminance on the overlap region across four adjacent half plane regions, is obtained, and thus, for example, light shading plate having a shading portion shown in FIG. 3 of Japanese Patent Opened 2001-268476, is used.

The projector unit housing portion 4a of main body unit 4 of the FIG. 2 is constructed to combine it to the edge of screen housing portion 4b of the main body unit 4 as one body, and comprises an outside frame (not shown) comprising a plurality of frame members combined in three dimensional direction, and the upper and lower coverings 4e provided to cover five surfaces (upper and lower sides and three sides except one side at the side of the screen housing portion 4b in four sides) at outer side of the outer frame and frame side cover 4f.

The projector unit 5 housed in the projector unit housing portion 4a of the main body unit 4 shown in FIG. 2 comprises, as shown in the exploded perspective view of FIG. 4(a), a plurality of the frame members 8 combined in three dimensional direction to form space for housing four projectors 1LU, 1LL, 1RU, and 1RL, the positioning member and the fixing member (both are not shown) to accommodate and to fix the projector in a space formed with the plural frame members 8, a plurality of plate members (not shown) to partition respective spaces, and five coverings (not shown) for covering five surfaces in six surrounding surfaces of the assembly of the plural frame members 8. The projector unit has the positioning mechanism (not shown) to arrange so as to obtain the predetermined positioning relation for the above inner frame. Moreover, it is needless to say that one surface of the remainder that is the opening among surrounding six surfaces of the assembly of the plural frame members 8, is an emanation surface of the luminous flux projected from the respective projectors accommodated in the above space.

The projector unit 5 has given some margins to each of the space for housing four projectors so as to hold a projector slightly larger than the projector of model selected at first of design. Therefore, in FIG. 4 (b) showing the state viewed from upper, of the projector accommodated in the projector unit 5, when projectors 1LU and 1RU selected in model, at first of design, are accommodated as shown by solid line, it is possible to hold in the space formed with plural frame members 8 in case of the projector of the size installed on the maximum possible accommodating range shown by the dotted line. Therefore, if there is a projector of size below maximum possible accommodating range shown by dotted line, and a projector having common projection distance and common projection angle, the projector requiring the exchange by the failure etc. can be exchanged with the use of said projector. In this case, the projector from the projector having the same size as the above maximum possible accommodating range to the projector smaller than the projector having the model selected at first of design, can be used so that choices at model selection become increased, and the exchange of the projector becomes easy. However, in case of exchanging the projector, the projector should be held and fixed in the above space so as to render the pupil position of the lens of the projector before and after the exchange equal to the same position.

The projector unit storage portion 4a of the main body unit 4 of FIG. 3 expands the size in the depth direction (optical axis direction of the projector) compared with the projector unit storage portion 4a of FIG. 2 by only predetermined size L, and other portions are similar to those of the projector unit storage portion 4a of FIG. 2, so that the explanation thereof is omitted. Moreover, the projector unit 5 shown in the perspective view of FIG. 5(a) is housed in the projector unit storage portion 4a of the main body unit 4 of FIG. 3, but the projector unit 5 expands the projector unit 5 of FIG. 4 (a) by only predetermined size L in the depth direction (optical axis direction of the projector), and other portions thereof are similar to those of the projector unit 5 of FIG. 4 (a), so that the explanation thereof is omitted.

Figure 4:
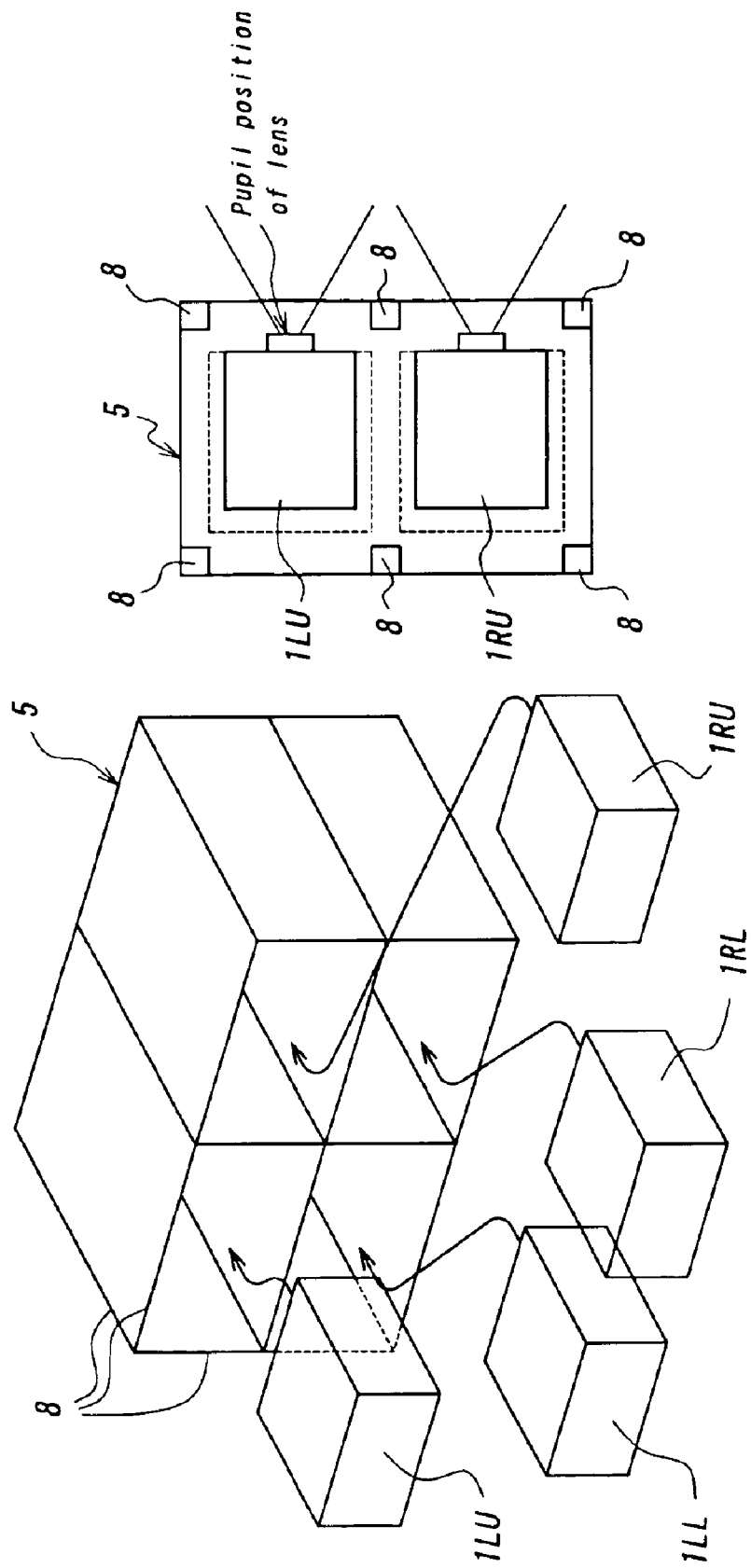
FIG. 4 (a) is an exploded perspective view showing the projector unit stored in the projector unit storage portion of the main body unit of the first embodiment, FIG. 4 (b) is a view showing the state viewed from upper, of the projector accommodated in the projector unit.
Figure 5:
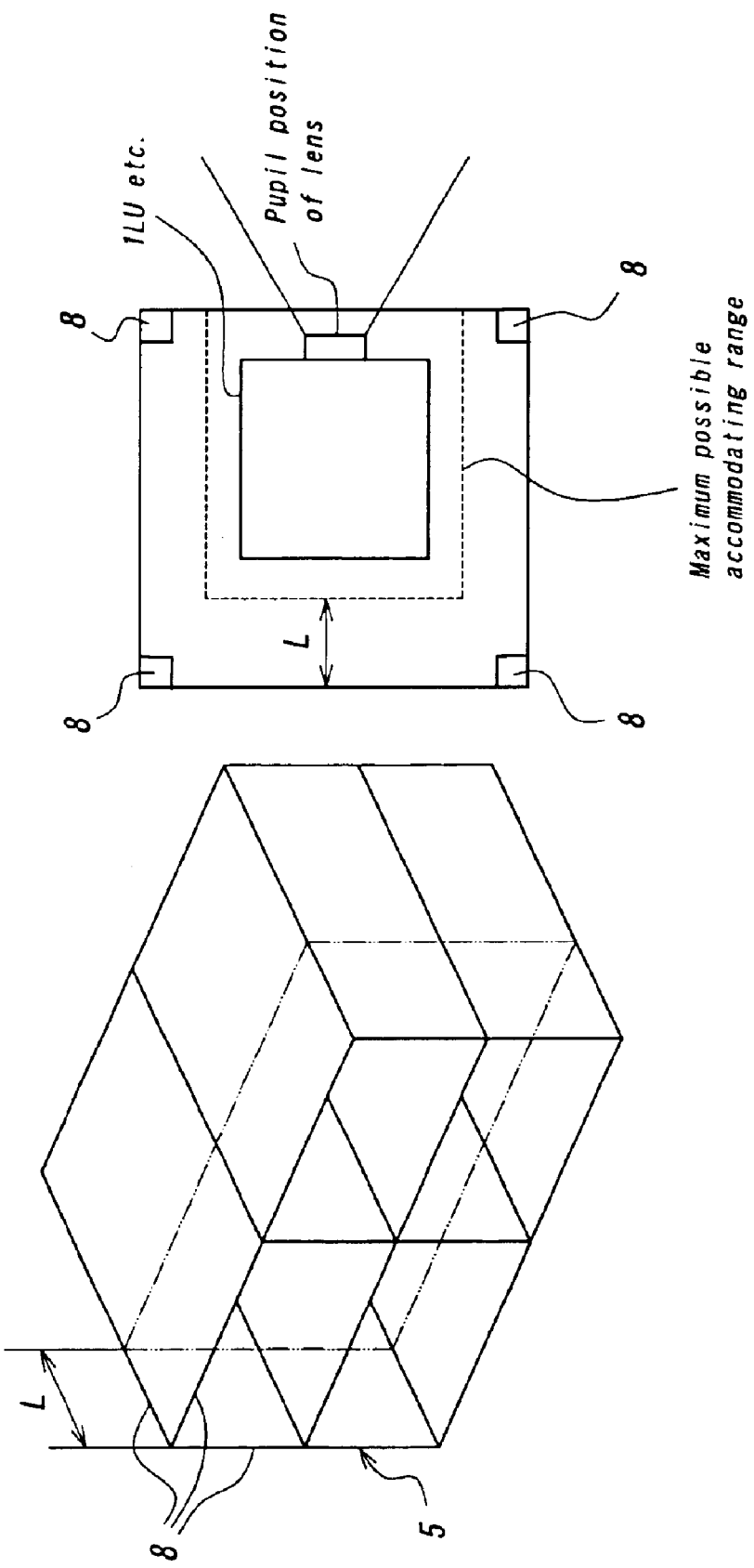
FIG. 5 (a) is an exploded perspective view showing the projector unit stored in the projector unit storage portion of the modified embodiment of the main body unit of the first embodiment, FIG. 5 (b) is a view showing the state viewed from upper, of the projector accommodated in the projector unit.

In the projector unit 5, the space accommodating four projectors expands by the size L in the depth direction for the case of FIG. 4 (a), so as to accommodate the considerable larger projector than the projector that selects the model at first of the design. Therefore, in FIG. 5(b) showing the state viewed from the upper of the projector accommodated in the projector unit 5, the original maximum possible accommodating range shown by the dotted line as well as the case of FIG. 4 (a), will be expanded substantially only by predetermined size L, and the feature of accommodating the projector with a large depth size becomes possible. Moreover, as described above, when the projector is housed and fixed in the expanded space, a system that the projector is put on the bottom surface of the space and combines by screw member or the like or, a system that hangs the projector on crown plate of the space and combines by the screw member or the like, can be used, but, in any case, the positional adjustment is performed so that the pupil position of the lens of the projector before and after the exchange may become the same position by using the positioning member properly.

Next, the assembling method of the table type display device of this embodiment is explained. First of all, an inner frame consisting of a mirror base member and a plurality of mirror support members coupled on the mirror base member is assembled to a prescribed position, and is fixed after the horizontality is adjusted by a leveling instrument. Next, reflection mirrors 2U and 2L are assembled and fixed to the above mirror support member. Next, light shading plates 6LU, 6LL, 6RU, and 6RL are assembled and fixed to a predetermined position of the inner frame.

Next, after assembling the screen housing portion 4b and the projector unit housing portion 4a of the main body unit 4 that constitute the table type display device, the main body unit 4 is arranged at and fixed to the position that becomes a given positional relation for an above inner frame at the position so as to obtain a given positional relation for the inner frame by using the positioning mechanism. Next, the screen 3 is assembled and fixed in the screen housing portion 4b of the main body unit 4 to support the screen 3 with the outer side frame, the top surface covering 4c, and the frame side cover 4d. Next, the size in the height direction of the outer side frame, the top surface covering 4c, and the frame side cover 4d is adjusted so as to make substantially parallel for the floor face with the use of the adjuster at installation time.

Next, after the projector unit 5 in which four projectors 1LU, 1LL, 1RU, and 1RL are accommodated and fixed, is housed in the projector unit housing portion 4a of the main body unit 4, the projector unit 5 is arranged and fixed by using the positioning mechanism so as to obtain the given positional relation for the inner frame. Therefore, the table type display unit in assembled state as shown in respective figures of FIG. 1, can be obtained.

Figure 6:
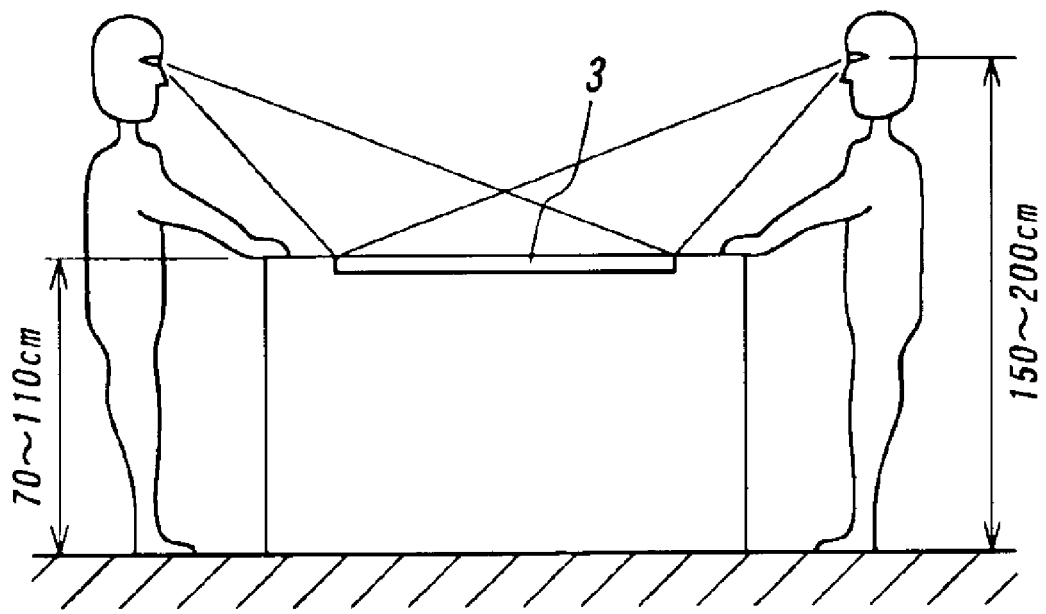
FIG. 6 is a view illustrating the positional relation between the viewer and the screen in the table type display device of the first embodiment.

Moreover, the table type display device of the present embodiment is constructed, for example, in case of using the main body unit 4 of FIG. 2, with following dimensions, by which the side of the table top (shown right and left direction) formed in the upper part of the device is about 2000 mm, the length thereof (shown back and forth direction) is about 1600 mm, the height of the device (shown vertical direction) is about 1000 mm, and the size of screen 3 is about 70 inches. Moreover, the screen housing portion 4b of the main body unit 4 is about 1300 mm in breadth and about 1600 mm in length, and the projector unit housing portion 4a of the main body unit 4 is about 700 mm in breadth, and about 1600 mm in length. Therefore, for example, the positional relation between the viewer and the screen 3 of the table type display unit is shown in FIG. 6.

Figure 7:
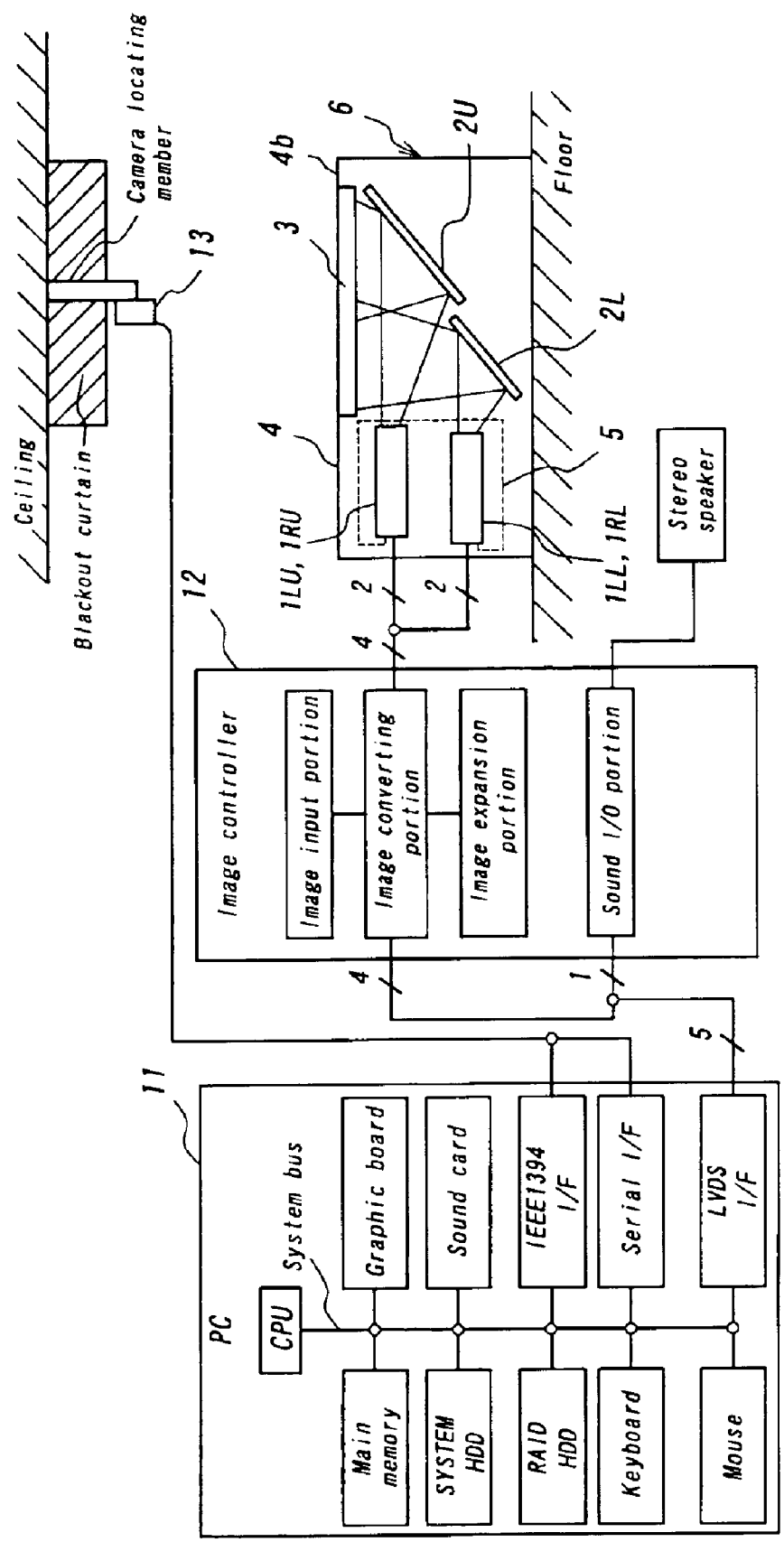
FIG. 7 is a view showing the image control system of the table type display device of first embodiment according to the present invention.

Next, an image control system of the table type display device according to this embodiment is explained with reference to FIG. 7. The image control system shown in FIG. 7 shows the constitution of the case whose input source is a digital signal, and comprises a personal computer (hereafter, referred to as PC) 11, an image controller 12, and a calibration camera 13. The PC11 comprises digital display interfaces, such as a CPU, a main memory, a system HDD, a RAID HDD to which image information is stored with compressed state, a keyboard, a mouse, a graphic board, a sound card, an IEEE1394 interface, serial interfaces, and a LVDS interface or the like, which are connected to the CPU with the system bus. The image controller 12 comprises an image input portion, an image converting portion, an image extension portion, and a sound I/O portion. Moreover, the DVI interface, the TMDS interface, the IEEE1394, and the USB interface, etc. may be used as a digital display interface without being limited to the LVDS interface.

The calibration camera 13 is fixed to a prescribed position of the ceiling by the camera locating member installed between blackout curtains installed in the ceiling, and is connected to the IEEE1394 interface of the PC11 and the serial interface through the calibration camera interface (not shown). The output terminal in the LVDS interface of PC11 is connected to the input side of the image converting portion of the image controller 12, the output side of the image converting portion of image controller 12 is connected to projectors 1LU, 1LL, 1RU, and 1RL, respectively, and the output side of the sound I/O portion of the image controller 12 is connected to the stereo speaker. Moreover, the stereo speaker is deleted for the case of the operation mode with for example unnecessary voice output according to the operation mode.

Next, the operation embodiment of the image control system shown in FIG. 7 is explained. For example, after turning on the power supply in order of the table type display device, the image controller 12, and PC11, a test chart is projected onto the screen 3 of the table type display device by operating the image controller 12. Next, the motion control of calibration camera 13 for the image correction is performed according to the instruction from PC11, and the test chart is taken. As a result, the taken test chart is taken into the PC11 through the IEEE1394 interface. Next, in the PC11, characteristics of the position, distortion, luminance, and shade, etc. of images projected from respective projectors on the screen 3 based on the photographic image of the test chart, are analyzed and the correcting data (for example, geometry correcting data and luminance correcting data) is calculated, and the calculated correction data is transmitted to the image controller 12.

Next, image controller 12 converts the image that outputs to respective projectors in such a manner that the image adapted to inherent characteristic to respective projectors based on the received correction data is obtained. Moreover, as an image sent to respective projectors, a partial image formed by dividing whole image to be displayed into four, and thus the partial image, in which the overlap region causes at displaying, is previously made. Next, under the state that each light shading plate is located at the latter step of the projection lens of respective projectors, the image from respective projectors is overlapped to the four halves surface regions of the screen 3, by synchronously outputting the image to respective projectors. As a result, respective projectors are located in the projector unit 5 to obtain the required projection angle and a projection distance, so that each of the luminous flux to form the image horizontally projected from respective projectors is projected onto the four halves surface regions of the screen 3, respectively, by bending upward the optical path with the reflection mirrors 2U and 2L. As a result, the display of the high resolution four SXGA can be achieved on the large screen of about 70 inches.

In that case, the geometry correction and the luminance correction of the overlap region between adjacent four halves surface regions and therebetween are performed. As a result, the image projected from respective projectors is projected as an image to which the substantial uniform luminance is obtained in the whole region of the screen 3. In this case, the correction data is fed back to the image data inputted to respective projectors but the adjustment is unnecessary in respective projectors themselves, so that the image displaying system, that do not depend on the individual difference of the projector, can be constructed.

Figure 8:
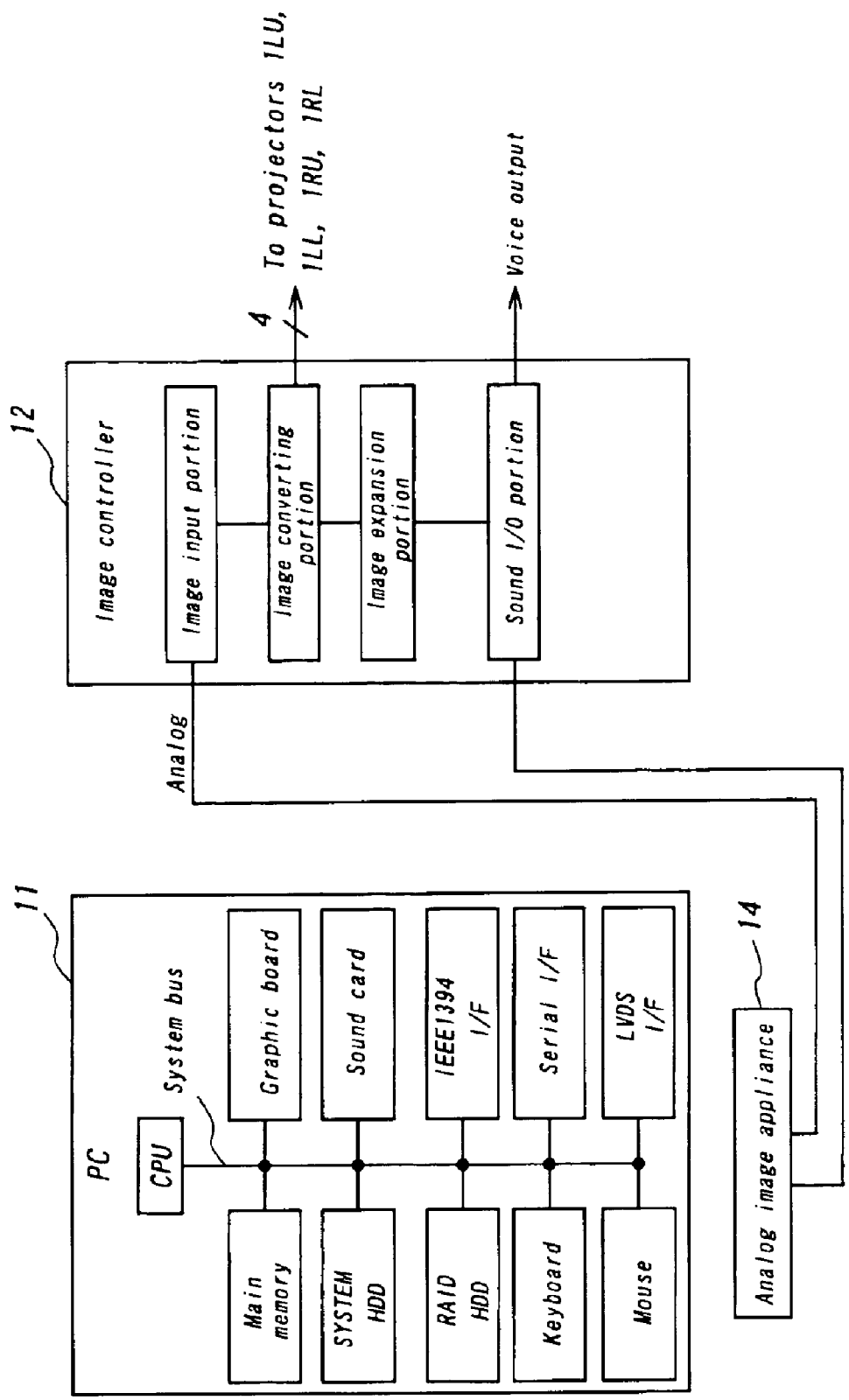
FIG. 8 is a view showing the modified embodiment of the image control system of the table type display device of first embodiment according to the present invention.

Moreover, the digital signal was used as an input source in the control system of FIG. 7, but in case of using the analog signal as an input source, the image control system shown in FIG. 8 is used. The image control system adds the modification to the image control system shown in FIG. 7 so as to input directly analog video signals from the analog image appliance 14 to the image input portion of the image controller 12, and the modification so as to input directly the analog voice signal from the analog image appliance 14 to the sound I/O portion of the imaging controller 12, and thus other portions thereof are constituted as well as the control system shown in FIG. 7.

According to the table type display device of the present embodiment, the main body unit 4 of the table type display device accommodates the screen 3, the reflection mirrors 2U and 2L, and the light shading plates 6LU, 6LL, 6RU, and 6RL, the projector unit 5 of the table type display device accommodates four projectors 1LU, 1LL, 1RU, and 1RL, so that when the necessity for exchanging the projector is caused, the exchange mounting work of the projector can be performed in only the projector unit 5, without influencing the main body unit 4 in any way. Therefore, the table type display device with easy exchange of the projector can be provided.

Moreover, according to the table type display device of the present embodiment, the projector unit 5 is constituted so as to be able to use for the plural kinds of projectors with common projection distance and common projection angle, commonly, so that with the use of a projector of the size installed in the above accommodation possible range, and a projector with a different resolution and common projection distance and common projection angle, the table type display device of the display resolution corresponding to user's needs can be easily be provided, and freedom degree of the system design can be improved. That is, the best projector can be selected according to user's budget and mode, and the best system can be constituted.

Moreover, according to the table type display device of the present embodiment can be used for, for example, display system of geographical information and air traffic control information, virtual reality system of medical application, and simulation system, game machine etc.

FIGS. 9(a)–(c) are three orthographic views showing a structure of the table type display device of second embodiment according to the present invention. The table type display device of the present embodiment changes its arrangement so as to distribute four two projectors 1LU, 1LL, 1RU, and 1RL right and left for the table type display device of first embodiment shown in FIGS. 1(a)–(c), thereby performing a shape changing and an arrangement changing in projector unit and projector unit housing portion, a shape changing of each portion of the main body unit 4, an utilizing number changing and an arrangement changing of the reflection mirror, and an arrangement changing in the light shading plate, and thus other portions thereof are constituted as well as the table type display device of the first embodiment.

That is, according to the table type display device of the present embodiment, as shown in respective figures of FIG. 9, plural M (four in shown embodiment) of projectors 1LU, 1LL, 1RU, and 1RL of rear projection system for projecting luminous flux to form image, are divided into two, projectors 1LU and 1LL are held in the projector unit 5L encased in the projector unit housing portion 4aL coupled to the left under end portion of the main body unit 4 as one body, and projectors 1RU and 1RL are held in the projector unit 5R encased in the projector unit housing portion 4aR coupled to the right under end portion of the main body unit 4 as one body. Moreover, the projector unit 5L and SR are only made half a size substantially along with reducing the projector accommodation number to the projector unit 5 of the first embodiment by half, and similarly, projector unit housing portions 4aL and 4aR are made in such a manner that projector unit housing portion 4a of the first embodiment is only made half a size substantially, so that the explanation thereof is omitted. Moreover, along with the arrangement modification of the projector unit housing portion, the screen housing portion 4a of the main body unit 4 has been changed so as to expand to the projector unit side.

Next, the arrangement of the reflection mirror according to the present embodiment is explained. In order to bend the optical path of the luminous flux emanating from the projectors 1LU, 1LL, 1RU, and 1RL in the right and left direction of FIG. 9(a) to the upward direction, reflection mirrors 2SLU, 2SLL, 2SRU, and 2SRL (Hereafter, it is called a small mirror) are provided with and the light shading plates 6LU, 6LL, 6RU, and 6RL are provided to a predetermined position of the small mirror side slippage between respective small mirrors and respective projectors. Moreover, in order to bend the luminous flux emanated from the projectors 1LU and 1RU and bent to the upward direction in the direction perpendicular to the paper plane of FIG. 9(a) (direction toward the screen 3), the reflection mirror (hereinafter, referred to as large mirror) 2L is provided, and in order to bend the luminous flux emanated from the projectors 1LL and 1RL and to bent to the upward direction in the direction perpendicular to the paper plane of FIG. 9(a) (direction toward the screen 3),the reflection mirror (hereinafter, referred to as middle mirror)2M is provided. Moreover, the inner frame etc. of the main body unit 4 are changed so as to adapt to the modification of the utilizing number and the arrangement modification of the reflection mirror.

According to the table type display device of the present embodiment, the effect similar to the table type display unit of the above embodiment is obtained, and the size of the longitudinal direction of the whole device is made compact so that by locating the device so as to touch the projector units 5L and 5R to the wall side, in case of presenting a wall at the installation site, the effect that the installation can be done in little installation space, is obtained.

Figure 10C:
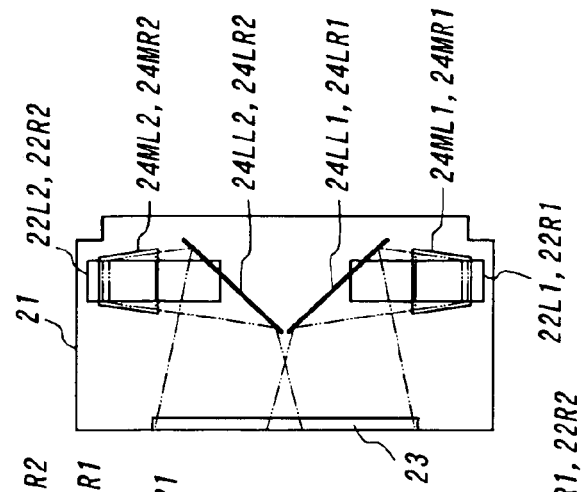
FIGS. 10(a)–(c) are three orthographic views showing a structure of the table type display device of third embodiment according to the present invention.
Figure 10A:
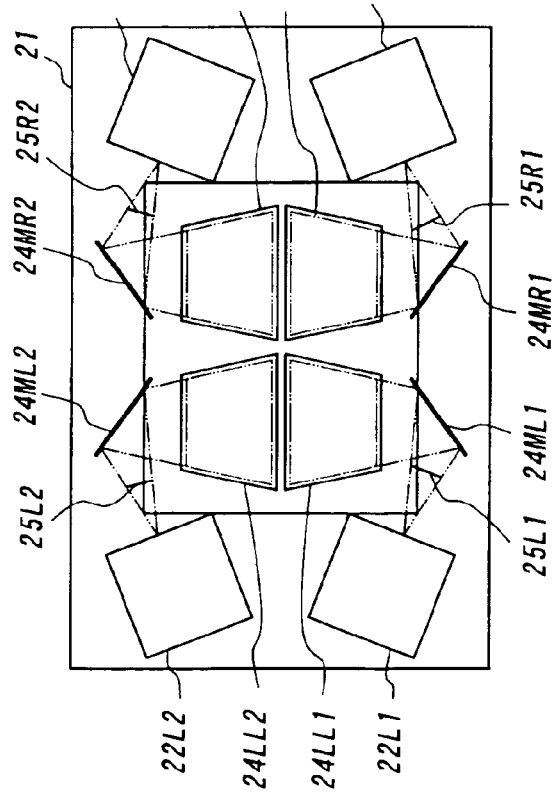
Figure 10B:
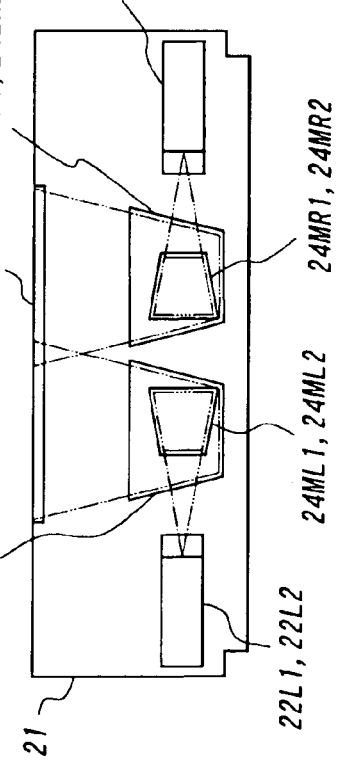

FIGS. 10(a)–(c) are three orthographic views showing a structure of the table type display device of third embodiment according to the present invention. The table type display device of the present embodiment changes its constitution so as to hold all constructional elements in one main body unit 4, without performing two unitizations of the main body for the table type display device of the first embodiment of FIG. 1 (a)–(c), and the arrangement changing etc. of respective constructional elements are performed according thereto.

That is, the table type display device of the present embodiment divides four projectors 22L1, 22L2, 22R1, and 22R2 of rear projection system for projecting luminous flux to form an image, are divided into two, the projectors 22L1 and 22L2 are installed on the part at left side of the main body unit 21 shown in FIG. 10(a) horizontally with a shown prescribed angle and, and the projectors 22R1 and 22R2 are installed on the part at right side of the main body unit 21 shown in FIG. 10(a) horizontally with a shown prescribed angle.

Moreover, in order to lead the luminous flux emanated from four projectors 22L1, 22L2, 22R1, and 22R2 to screen 23, middle mirrors 24ML1, 24ML2, 24MR1, and 24MR2 for bending the emanated luminous flux toward upper direction of FIG. 10(a) in correspondence with the respective projectors, are provided and the light shading plates 25L1, 25L2, 25R1, and 25R2 are provided to a predetermined position of the middle mirror side slippage between respective middle mirrors and respective projectors. In addition, large mirrors 24LL1, 24LL2, 24LR1, and 24LR2 for bending the luminous flux bent with respective middle mirrors in the direction perpendicular to paper surface of FIG. 11(a) (direction toward the screen 23), are provided.

According to the table type display device of the present embodiment, when a projector of the type that can not perform a vertical installation as a projector, is used, projector housing portion is compactly constituted by locating said projector horizontally, and the table type display device capable of making the size in longitudinal direction of the whole device compact can be provided.

Figure 11B:
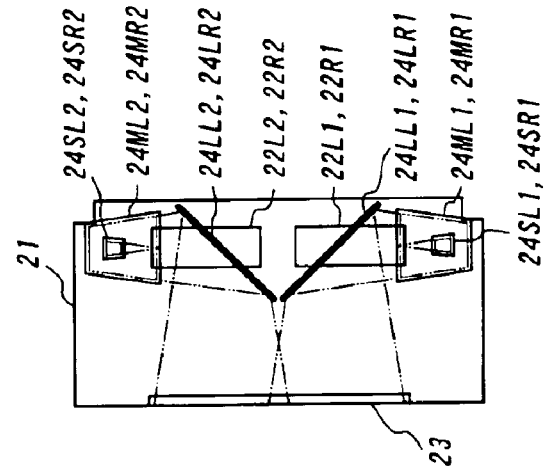
FIGS. 11(a)–(c) are three orthographic views showing a structure of the table type display device of fourth embodiment according to the present invention.
Figure 11A:
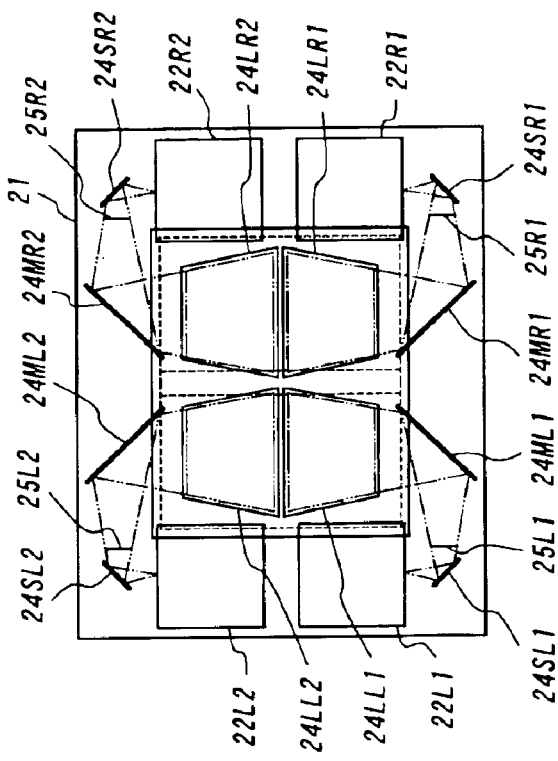
Figure 11C:
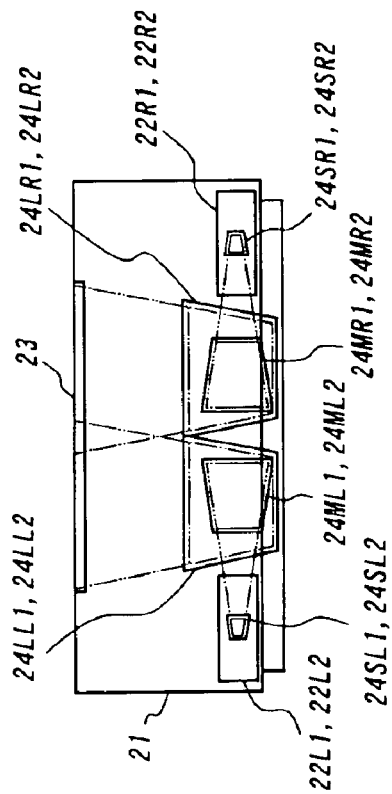

FIGS. 11(a)–(c) are three orthographic views showing a structure of the table type display device of fourth embodiment according to the present invention. The table type display device of the present embodiment performs the arrangement change of the projector, an utilizing number change and an arrangement change of the reflection mirror, and the arrangement change of the light shading plate for the table type display device of third embodiment of FIGS. 10(a)–(c), and other portions thereof are constituted as well as the table type display device of the third embodiment.

Figure 12A:
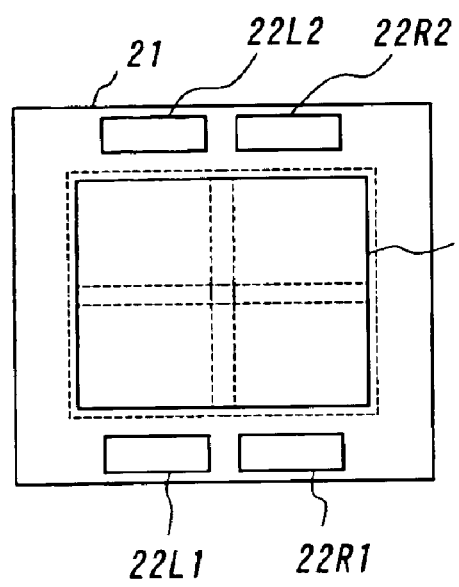
FIGS. 12(a)–(c) are three orthographic views showing a structure of the table type display device of fifth embodiment according to the present invention.

That is, the table type display device of the present embodiment divides four projectors 22L1, 22L2, 22R1, and 22R2 of rear projection system for projecting luminous flux to form an image, into two, projectors 22L1 and 22L2 are installed on the left side portion of FIG. 10(a) of the main body unit 21 horizontally and projectors 22R1 and 22R2 are installed on the right side portion of FIG. 12(a) of the main body unit 21 horizontally.

Moreover, in order to lead the luminous flux emanated from the projectors 22L1, 22L2, 22R1, and 22R2 to screen 23, small mirrors 24SL1, 24SL2, 24SR1, and 24SR2 for bending the emanated luminous flux toward right and left direction of FIG. 11(a) in correspondence with the respective projectors, are provided. Moreover, middle mirrors 24ML1, 24ML2, 24MR1, and 24MR2 for bending the luminous flux bent with respective small mirrors toward upper direction of FIG. 11(a), are provided and the light shading plates 25L1, 25L2, 25R1, and 25R2 are provided to a predetermined position of the small mirror side slippage between respective small mirrors and respective middle mirrors. In addition, large mirrors 24LL1, 24LL2, 24LR1, and 24LR2 for bending the luminous flux bent with respective middle mirrors in the direction perpendicular to paper surface of FIG. 11(a) (direction toward the screen 23), are provided.

According to the table type display device of the present embodiment, when a projector of the type that can not perform a vertical installation as a projector, is used, projector housing portion is compactly constituted by horizontally locating said projector and the table type display device capable of making the size in longitudinal direction of the whole device can be provided.

Figure 12C:
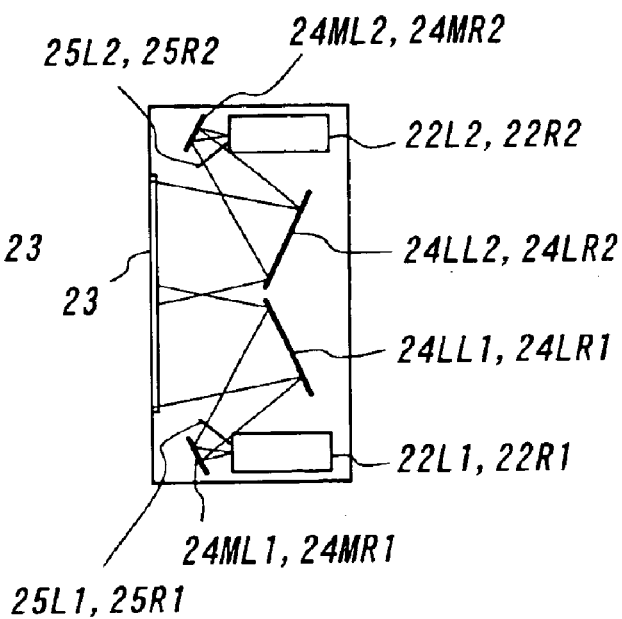
Figure 12B:
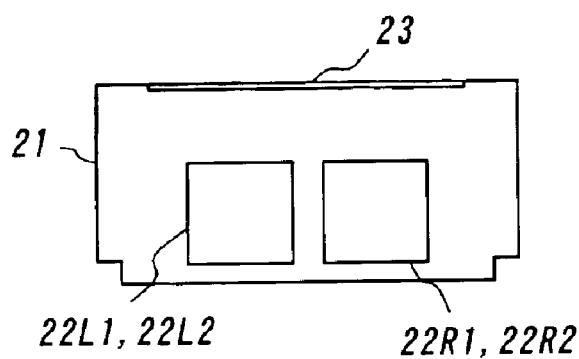

FIGS. 12(a)–(c) are three orthographic views showing a structure of the table type display device of fifth embodiment according to the present invention. The table type display device of the present embodiment performs the arrangement change of the projector, an utilizing number change and an arrangement change of the reflection mirror, and the arrangement change of the light shading plate for the table type display device of third embodiment of FIGS. 10(a)–(c), and other portions thereof are constituted as well as the table type display device of the third embodiment.

That is, the table type display device of the present embodiment divides four projectors 22L1, 22L2, 22R1, and 22R2 of rear projection system for projecting luminous flux to form an image, into two, projectors 22L2 and 22R2 are installed on the upper side portion of FIG. 12(a) of the main body unit 21 vertically and projectors 22L1 and 22R1 are installed on the lower side portion of FIG. 12(a) of the main body unit 21 vertically.

Moreover, in order to lead the luminous flux emanated from the projectors 22L1, 22L2, 22R1, and 22R2 to screen 23, middle mirrors 24ML1, 24ML2, 24MR1, and 24MR2 for bending the emanated luminous flux at angle shown in FIG. 12(c) toward under the device by bringing the luminous flux into correspondence with the respective projectors, are provided. Moreover, large mirrors 24LL1, 24LL2, 24LR1, and 24LR2 for bending the luminous flux bent with respective middle mirror in the left direction of FIG. 12(c) (direction toward the screen 23), are provided, and, the light shading plates 25L1, 25L2, 25R1, and 25R2 are provided to a predetermined position of the middle mirror side slippage between respective middle mirrors and respective large mirrors.

According to the table type display device of the present embodiment, in case of using a projector of the type capable of performing a vertical installation upward as a projector, the region around the screen can be made compact as much as possible, and the table type display unit that simplifies the construction by making the number of the mirror to be used a minimum, can be provided.

FIGS. 13 (a)–(d) are three orthographic views showing a structure of and a view showing the modified embodiment of the structure of the table type display device of sixth embodiment according to the present invention. The table type display device of the present embodiment performs the arrangement change of the projector, the arrangement change of the reflection mirror, and the arrangement change of the light shading plate for the table type display device of fifth embodiment of FIGS. 12(a)–(c), and other portions thereof are constituted as well as the table type display device of the fifth embodiment.

Figure 13A:
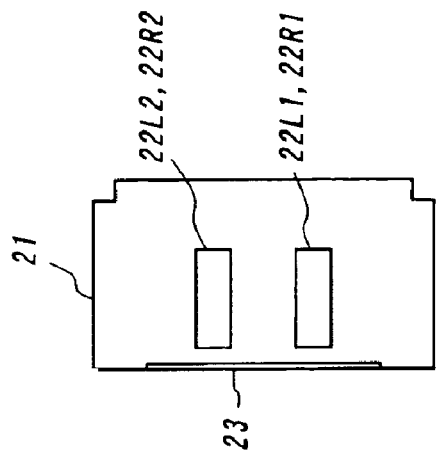
FIGS. 13 (a)–(d) are three orthographic views showing a structure of and a view showing the modified embodiment of the structure of the table type display device of sixth embodiment according to the present invention.

That is, four projectors 22L1, 22L2, 22R1, and 22R2 of rear projection system for projecting luminous flux to form an image, are divided into two projectors 22L2 and 22L2 are installed on the left side portion of FIG. 13(a) of the main body unit 21 vertically and projectors 22R1 and 22R2 are installed on the right side portion of FIG. 13(a) of the main body unit 21 vertically.

Figure 13B:
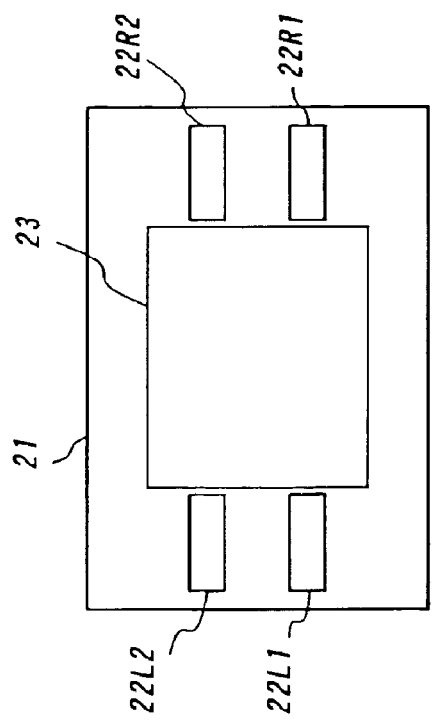
Figure 13C:
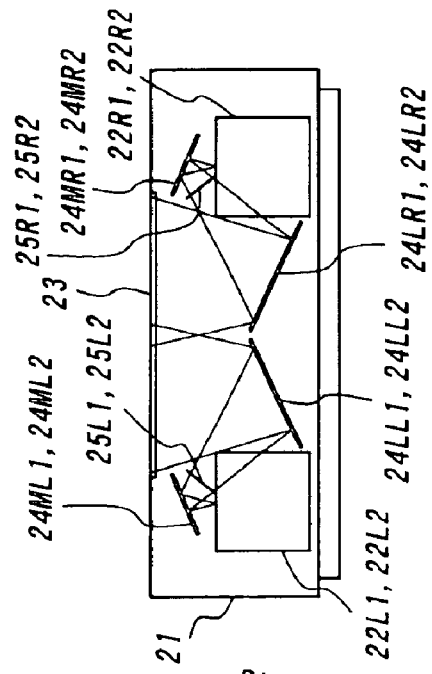

Moreover, in order to lead the luminous flux emanated from the projectors 22L1, 22L2, 22R1, and 22R2 to screen 23, and middle mirrors 24ML1, 24ML2, 24MR1, and 24MR2 for bending the emanated luminous flux at an angle shown in FIG. 13(b) in correspondence with the respective projectors, are provided. Moreover, large mirrors 24LL1, 24LL2, 24LR1, and 24LR2 for bending the luminous flux bent with respective middle mirrors in the upper direction of FIG. 13(c) (direction toward the screen 23), are provided and the light shading plates 25L1, 25L2, 25R1, and 25R2 are provided to a predetermined position of the middle mirror side slippage between respective middle mirrors and respective large mirrors.

Figure 13D:
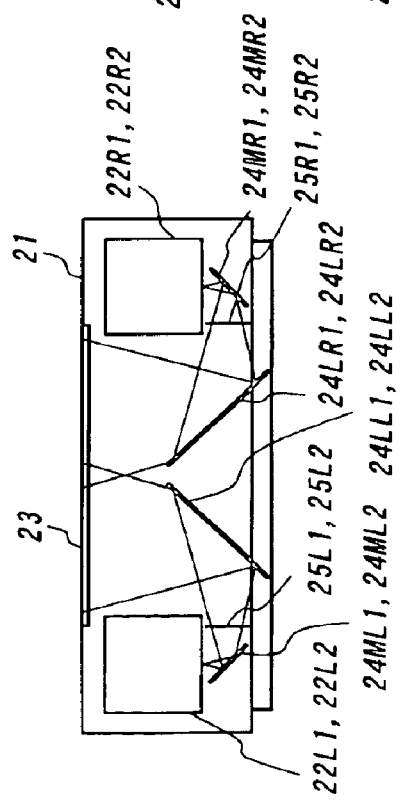

Moreover, in the constitution of FIG. 13(b), luminous flux is made emanated from respective projectors downward with downward installation, but instead thereof, luminous flux may be emanated from respective projectors upwardly with upward installation as shown in FIG. 13(d). In that case, the arrangement of respective middle mirrors, the large mirror, and the light shading plate is modified as shown in the drawings.

According to the table type-display device of the present embodiment, when a projector of the type capable of performing a vertical installation upwardly (or downwardly) as a projector, is used, the table type display device capable of making the size in longitudinal direction of the whole device can be provided.

FIGS. 14 (a)–(d) are three orthographic views showing a structure of and a view showing the modified embodiment of the structure of the table type display device of seventh embodiment according to the present invention. The table type display device of the present embodiment performs the arrangement change of the projector, the arrangement change of the reflection mirror, and the arrangement change of the light shading plate for the table type display device of fifth embodiment of FIGS. 12(a)–(c), and other portions thereof are constituted as well as the table type display device of the fifth embodiment.

That is, according to the table type display device of the present embodiment, four projectors 1LU, 1LL, 1RU, and 1RL of rear projection system for projecting luminous flux to form image, are divided into two, projectors 22L2 and 22R2 are installed on the upper portion of FIG. 12(a) of the main body unit 21 vertically, and projectors 22L1 and 22R2 are installed on the lower portion of FIG. 12(a) of the main body unit 21 vertically.

Figure 14C:
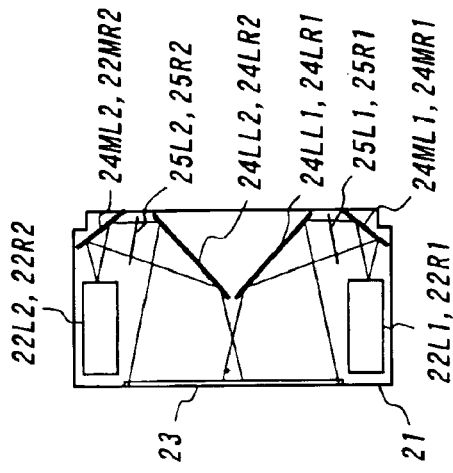
FIGS. 14 (a)–(d) are three orthographic views showing a structure of and a view showing the modified embodiment of the structure of the table type display device of seventh embodiment according to the present invention.

Moreover, in order to lead the luminous flux emanated from the projectors 22L1, 22L2, 22R1, and 22R2 to screen 23, middle mirrors 24ML1, 24ML2, 24MR1, and 24MR2 for bending the emanated luminous flux at angle shown in FIG. 14(c) toward upper portion of the device by bringing the luminous flux into correspondence with the respective projectors, are provided. Moreover, large mirrors 24LL1, 24LL2, 24LR1, and 24LR2 for bending the luminous flux bent with respective middle mirrors in the left direction of FIG. 14(c) (direction toward the screen 23), are provided, and the light shading plates 25L1, 25L2, 25R1, and 25R2 are provided to a predetermined position of the middle mirror side slippage between respective middle mirrors and respective large mirrors.

Figure 14D:
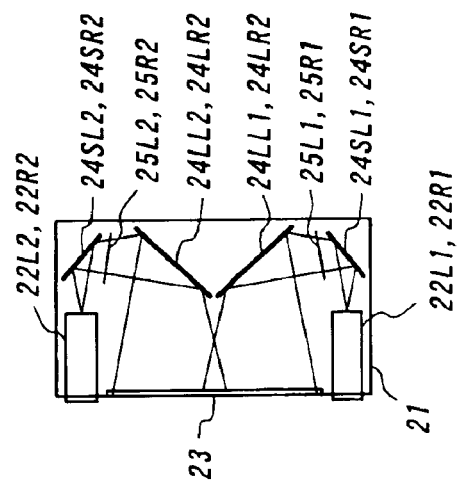
Figure 14A:
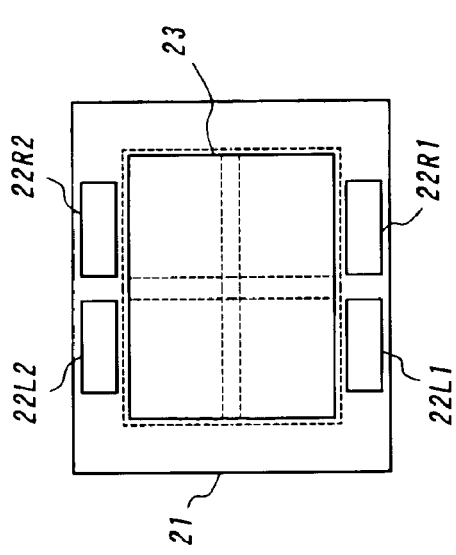
Figure 14B:
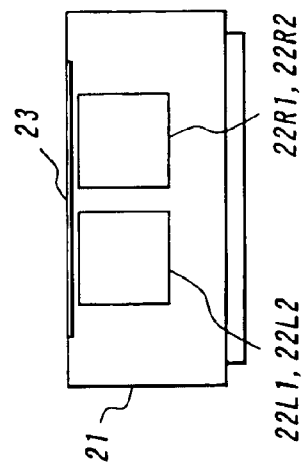
Figure 15:
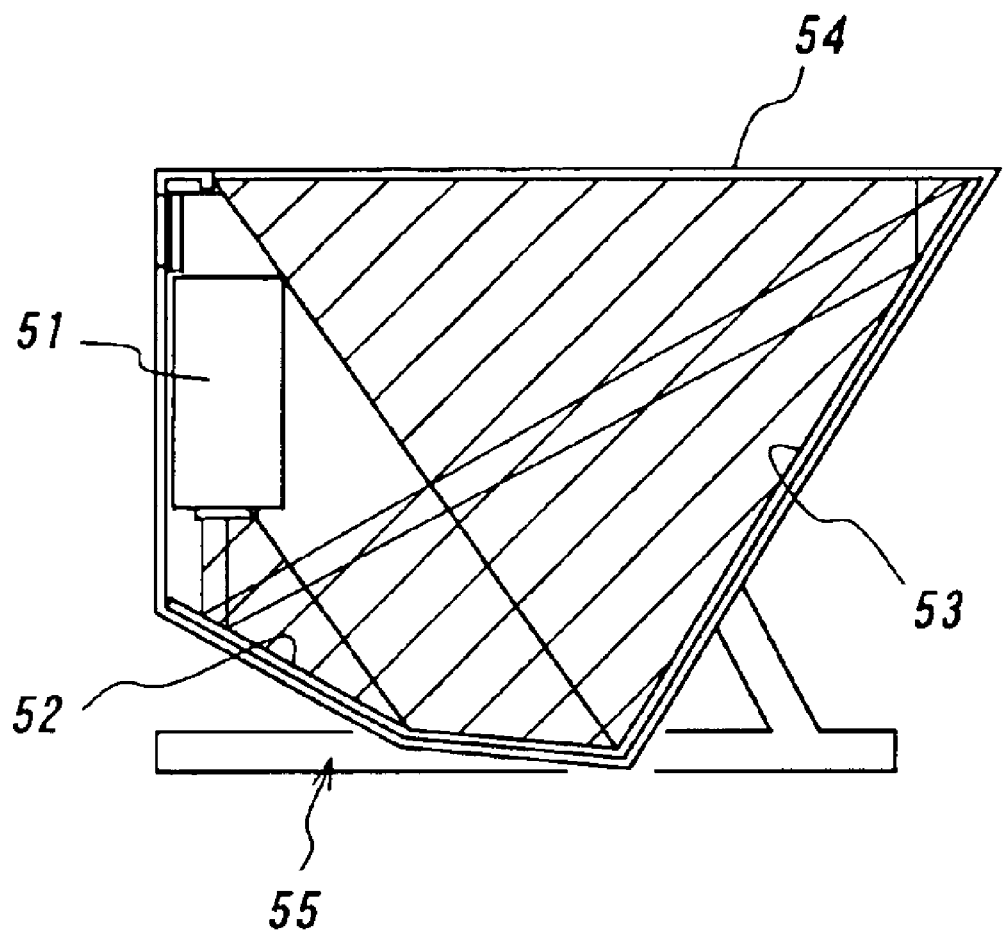
FIG. 15 is a view explaining the prior art.

Moreover, FIG. 14(b) shows the case, in which the respective projectors downward located are comparatively small, but in the case of a projector whose vertical direction size is longer than the above case, the projector is constituted as shown in FIG. 14(d). In this case, the edge of respective projectors protrudes beyond the top surface of the device, and the middle mirror is changed to a small mirror.

According to the table type display device of the present embodiment, when a projector of the type that can perform a vertical installation as a projector, is used, the region around the screen can be made compact as much as possible and the table type display device with simple construction can be provided by making the number of the utilized mirrors minimum.

Moreover, in the above respective embodiments, the constitution, in which the light shading plate is not installed between the projector and the mirror, is disclosed, but when the overlapping process is not performed, the light shading plate in the above respective embodiments is omitted.

Moreover, in the above respective embodiments, as a used projector, the rear projection type projector using a liquid crystal panel of transparent type and reflection type, and the rear projection type projector (DLP system projector) using the DMD element, can be applied. Moreover, various choices such as use of the image and use of the luminance etc. such as SVGA, XGA, and SXGA are present as a display resolution, so that the best projector can be selected according to user's budget and mode.

What is claimed is:

1. A table type display device comprising:

a plurality of projectors for projecting light to form an image;

a plurality of reflection mirrors for reflecting the light projected form the plurality of projectors;

a horizontally installed screen onto which the light reflected by the plurality of reflection mirrors is projected, the plurality of reflection mirrors projecting the light onto respective predetermined regions of the screen;

a main body which houses the screen and the plurality of reflection mirrors; and a secondary case which houses the plurality of projectors.

2. The table type display device as claimed in claim 1, wherein the secondary case is adapted to interchangeably house a plurality of types of projectors having a same projection distance and a same projection angle.

3. The table type display device as claimed in claim 1, wherein the light projected by each of the plurality of projectors is reflected in a same direction by the plurality of reflection mirrors.

4. The table type display device as claimed in claim 1, wherein the predetermined regions of the screen overlap at overlapping regions.

5. The table type display device as claimed in claim 4, further comprising a plurality of light shading plates respectively provided between the plurality of projectors and the plurality of reflection mirrors to correct a luminance of the overlapping regions.

6. A table type display device comprising:

four projectors, including two upper projectors and two lower projectors, for projecting light to form an image;

four small mirrors for respectively reflecting the light projected from the four projectors;

one medium mirror which is provided in a lower part of the device and which corresponds to the two lower projectors such that the light projected by the two lower projectors, and reflected by a corresponding two of the four small mirrors, is reflected by the one medium mirror one large mirror which is provided in an upper part of the device and which corresponds to the two upper projectors such that the light projected by the two upper projectors, and reflected by a corresponding two of the four small mirrors, is reflected by the one large mirror; and a horizontally installed screen onto which the light reflected by the medium mirror and the large mirror is projected, the medium mirror and the large mirror projecting the light onto respective predetermined regions of the screen.

7. A table type display device comprising:

four projectors for projecting light to form an image;

four small mirrors for respectively reflecting the light projected from the four projectors;

at least one common mirror for reflecting the light reflected by at least two of the four small mirrors; and a horizontally installed screen onto which the light reflected by the common mirror is projected, the common mirror projecting the light onto a predetermined region of the screen.

* * * * *